July 22, 1969  J. P. KOSTA, JR  3,457,522
TRANSISTOR OSCILLATOR WITH VIBRATING REED POWER SUPPLY
Filed Nov. 26, 1965  2 Sheets-Sheet 1

INVENTOR
JAMES P. KOSTA, Jr.
BY: Donnelly, Meaney & Harrington
ATTORNEYS

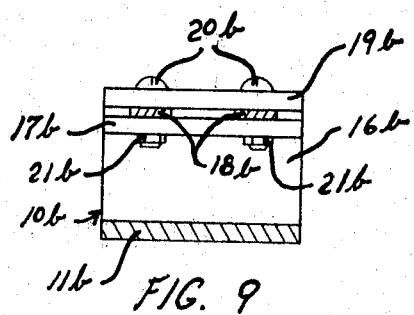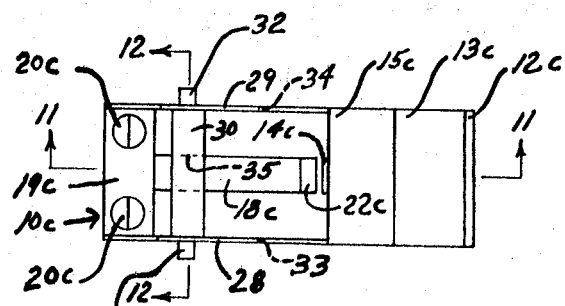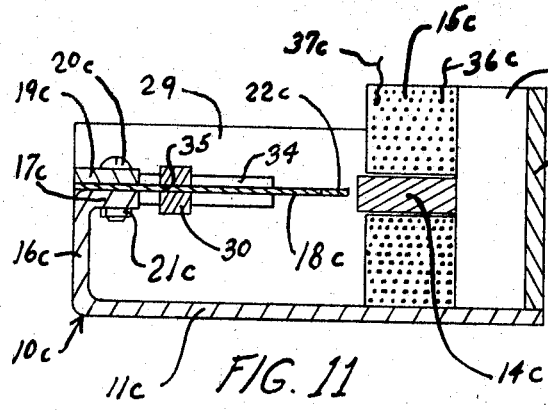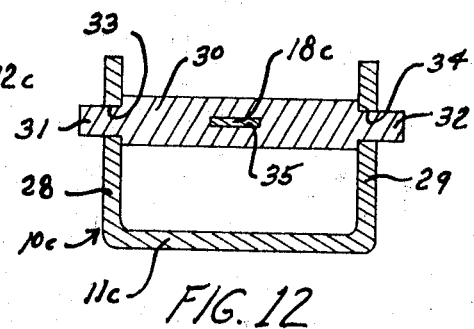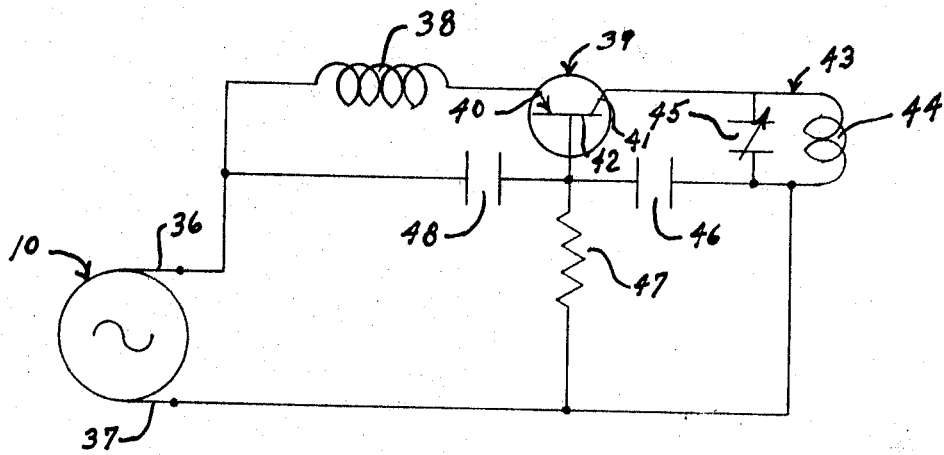

United States Patent Office 3,457,522
Patented July 22, 1969

3,457,522
TRANSISTOR OSCILLATOR WITH VIBRATING
REED POWER SUPPLY
James P. Kosta, Jr., 2200 Lake Road,
Belmont, Calif. 94002
Filed Nov. 26, 1965, Ser. No. 509,821
Int. Cl. H03b 5/30, 11/06; H02k 35/06
U.S. Cl. 331—71                                    8 Claims

ABSTRACT OF THE DISCLOSURE

A transducer power supply including a pole piece, an electric coil disposed in a position surrounding the pole piece, a magnet mounted either at one end of the pole piece or at a position surrounding the coil, at least one reed mounted in a plane parallel to the pole piece and at one end of the pole piece, and means for disturbing the reed to cause the reed to vibrate at its mechanical resonant frequency to disturb the magnetic lines of flux passing from the magnet to the pole piece and thus induce a voltage into the electrical coil that surrounds the pole piece to produce alternating electrical energy in the form of a sine wave. The transducer can be used as the sole source of power for a radio frequency oscillator.

---

This invention relates generally to an electric power supply, and more particularly, to a novel electromechanical transducer power supply which is adapted to be used as the sole source of power to drive an oscillator, a transmitter, various electronic circuits and types of relays, and which may also be used as a gate signal source with which to trigger silicon controlled rectifiers into conduction.

Heretofore, a silicon controlled rectifier has required complex circuitry in order to provide the gate signal needed to trigger the rectifier into conduction. A disadvantage of such prior art circuitry is that it subjects a silicon controlled rectifier to transient voltage spikes which enter the gate electrode and which may inadvertently trigger the rectifier. A further disadvantage of the prior art circuitry is that it has heretofore been a costly proposition to provide an explosion-proof switch to prevent explosions due to arcing and the making and breaking of a circuit. A disadvantage of the prior art transducer power supplies is that they do not develop sufficient current to drive a transistor oscillator.

In view of the foregoing, it is an important object of the present invention to provide a novel transducer power supply which is adapted to overcome the aforementioned disadvantages of the prior circuitry.

It is another object of the present invention to provide a novel transducer power supply which is adapted to be used as a source of power to drive frequency sensitive relays of the solid state and electromechanical types.

It is a further object of the present invention to provide a novel transducer which has an output in the form of a sine wave, the frequency of which can be controlled.

It is still another object of the present invention to provide a novel transducer which may be used to provide the gate signal needed to trigger a silicon controlled rectifier into conduction by connecting the output of the transducer to the gate and cathode terminals of the rectifier, whereby the gate terminal of the rectifier is isolated from the balance of the circuit in which the rectifier is located so as to eliminate the possibility of having transient voltage spikes enter the gate electrode and inadvertently trigger the rectifier.

It is still a further object of the present invention to provide a novel transducer which may be used as the gate pulse source of a silicon controlled rectifier to provide a manually or mechanically operated silicon controlled rectifier.

It is still another object of the present invention to provide a novel transducer having a manually or mechanically operated portion that may be mechanically and electrically isolated from the transducer coil and a silicon controlled rectifier which it is adapted to trigger.

It is still another object of the present invention to provide a novel transducer which is adapted to provide a remotely disposed, contactless, nonhermetic electromechanical, explosion proof switch for a silicon controlled rectifier.

It is still a further object of the present invention to provide a novel self-powered oscillator incorporating a novel electromechanical transducer.

It is still another object of the present invention to provide a novel transducer which is adapted to produce one or more discrete sine waves having frequencies controlled by the mechanical resonant frequency of one or more reeds or by means of a dampening collar for the reed or reeds, by moving the collar along the length of the reed or reeds to vary the mechanical frequency of the reed or reeds.

It is still another object of the present invention to provide a novel transducer power supply comprising a pole piece, an electrical coil disposed in a position surrounding the pole piece, a magnet mounted either at one end of the pole piece or at a position surrounding the coil, at least one reed mounted in a plane parallel to the pole piece and at one end of the pole piece, and means for disturbing the reed to cause the reed to vibrate at its mechanical resonant frequency to disturb the magnetic lines of flux passing from the magnet to the pole piece and thus induce a voltage into the electrical coil that surrounds the pole piece to produce electrical energy in the form of a sine wave.

Other objects, features and advantages of this invention will be apparent from the following detailed description, appended claims, and the accompanying drawings.

In the drawings:

FIG. 9 is an elevational section view of the structure illustrated in FIG. 7, taken along the line 9—9 thereof, and looking in the direction of the arrows;

FIG. 10 is a top plan view of a fourth electromechanical transducer made in accordance with the principles of the present invention;

FIG. 11 is an elevational section view of the structure illustrated in FIG. 10, taken along the line 11—11 thereof, and looking in the direction of the arrows;

FIG. 12 is an elevational section view of the structure illustrated in FIG. 10, taken along the line 12—12 thereof, and looking in the direction of the arrows; and, FIG. 13 is a circuit diagram illustrating an oscillator made in accordance with the principles of the present invention.

Figure 1:
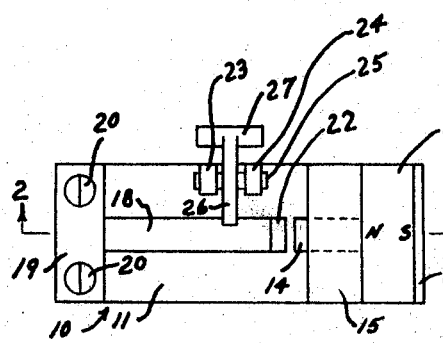
FIG. 1 is a top plan view of an electromechanical transducer made in accordance with the principles of the present invention.
Figure 2:
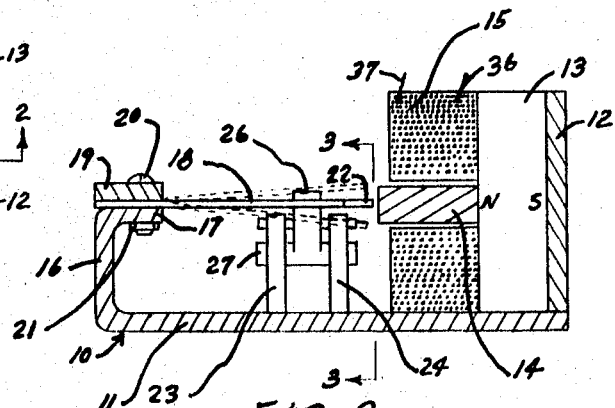
FIG. 2 is an elevational section view of the structure illustrated in FIG. 1, taken along the line 2—2 thereof, and looking in the direction of the arrows.
Figure 3:
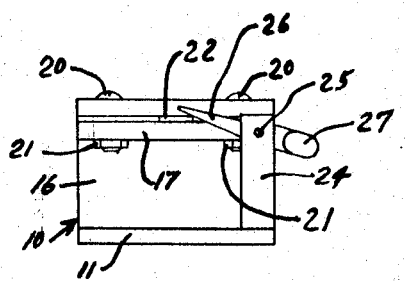
FIG. 3 is an elevational section view of the structure illustrated in FIG. 2, taken along the line 3—3 thereof, and looking in the direction of the arrows.

Referring now to the drawings, and in particular to FIGS. 1, 2, and 3, the reference numeral 10 generally designates an electromechanical transducer made in accordance with the principles of the present invention. The transducer 10 is a first illustrative embodiment of the invention and comprises a single reed unit which is manually operated. The transducer 10 is provided with a frame which includes a base plate 11 that is made from a suitable nonmagnetic or magnetic material, as desired.

As shown in FIGS. 1 and 2, a vertically disposed magnet shunt plate 12, made from any suitable material, as for example, iron, is mounted in a fixed manner on the right end of the frame base plate 11. Fixed on the frame base plate 11 in a position adjacent the magnetic shunt plate 12 is a suitable magnet 13. A cylindrical pole piece 14 is fixed to the inner or left side of the magnet 13, as viewed in FIGS. 1 and 2, in a position spaced above the frame base plate 11. It will be understood, that the magnetic shunt plate 12 and the magnet 13 may be secured to the frame base plate 11 by any suitable means, as by brass retaining screws. It will also be seen that the pole piece 14 is horizontally disposed in a position parallel to the frame base plate 11. The pole piece 14 is made from any suitable material, as for example, permeable iron. As shown in FIGS. 1 and 2, a coil 15 is operatively mounted about the pole piece 14 in a position surrounding the same. The outer end of the coil 15 is disposed against the magnet 13 and the inner end of the coil 15 terminates adjacent the inner end of the pole piece 14. The magnet 13 is thus mounted behind the coil 15.

As best seen in FIGS. 2 and 3, the transducer frame further includes an integral, upwardly extended plate 16 on the left end of the frame base plate 11. A horizontal, integral, inwardly extended transverse plate 17 is formed on the upper end of the plate 16 and extends inwardly over the frame base plate 11 in a direction facing the pole piece 14 and the coil 15. An elongated reed 18 is centrally disposed over the frame base plate 11 and in a horizontal position spaced apart upwardly from the frame base plate 11. The outer end of the reed 18 is seated on the transverse support plate 17 and is fixed thereto by the transverse retaining plate 19, the retaining screws 20, and the unts 21. The retaining plate 19, the screws 20, and the nuts 21 are made from a nonmagnetic material, as for example, brass. The reed 18 is disposed on a plane parallel to the longitudinal axis of the pole piece 14 and at one end thereof. The longitudinal axis of the reed 18 is also parallel to the longitudinal axis of the pole piece 14.

The reed 18 may be made from either magnetic or nonmagnetic material. If magnetic material is used to form the reed, the reed itself can be used to disturb the magnetic flux lines. If the reed 18 is formed from a nonmagnetic material, such as plastic, it is necessary to add a magnetic material to the tip of the reed at the point where the reed passes the inner end of the pole piece 14. As best seen in FIGS. 1 and 2, the inner end of the reed 18 is provided with a tip made from a suitable magnetic material, indicated by the numeral 22, as for example, permeable iron. A suitable material for the reed 18 is spring steel. The inner end of the reed tip 22 is spaced apart from the inner end of the pole piece 14 by an air gap. It is desirable that the air gap between the pole piece 14 and the reed tip 22 be as small as possible without mechanical interference between these parts. A preferable dimension for the air gap is about .005". It will be understood that the further away the reed tip 22 is disposed from the pole piece 14, the smaller the induced voltage will be. Accordingly, it is desirable to dispose the reed tip 22 as close to the pole piece 14 to obtain the greatest possible voltage induced in the coil 15 without mechanical interference.

It will be understood that the permeable iron on the reed tip 22 functions as a shielding material to increase the current output of the transducer for applications where greater current output of the transducer is required. It will be understood that any suitable shielding material may be used. A shielding material is of a nature in that it greatly attracts the magnetic flux without becoming magnetized itself. This action permits the reed 18 to readily vibrate in front of the pole piece 14 without adverse dampening effects on the reed 18. The transducer produces electrical energy as long as the reed 18 vibrates.

A manually operated toggle type actuator means for disturbing the reed 18 is illustrated in FIGS. 1, 2 and 3. The toggle type reed actuator means includes a pair of vertically disposed, spaced apart bars or legs 23 and 24 which form a bracket for supporting a pivot pin 25. The pivot pin 25 pivotally supports a trip arm 26 which is provided on the outer end thereof with an integral transverse handle 27. The trip arm 26 and the integral handle 27 may be made from a suitable nonmagnetic material, as for example, a suitable plastic. The pivot pin 25 is preferably made from steel. The pivot pin bracket legs 23 and 24 are made from a suitable nonmagnetic material, as for example, brass.

Although a manually operated means is illustrated in FIGS. 1, 2 and 3 for actuating or disturbing the reed 18, it will be understood that a suitable mechanical means may be used as, for example, a reed rotary actuating member of the type shown in U.S. Patent 3,056,932. The last-mentioned patent also illustrates a suitable push button manual means which may be used to disurb or actuate the reed 18.

The transducer illustrated in FIGS. 1, 2 and 3 develops electrical energy in the following described manner. The trip arm 26 is operated upwardly or downwardly, depending on its initial position relative to the reed 18, so as to disturb or actuate the reed 18 and cause it to vibrate at its mechanical resonant frequency. As the reed 18 vibrates in front of the pole piece 14 it disturbs the magnetic lines of flux passing from the magnet 13 to the pole piece 14, thereby inducing a voltage into the electrical coil 15 which surrounds the pole piece 14. The induced electrical energy is in the form of a sine wave. It will be understood that the frequency of the output sine wave is controlled by the mechanical resonant frequency of the reed 18. The transducer produces electrical energy as long as the reed 18 vibrates. This energy can be used as the sole source of power to drive various oscillators and transmitters, as for example, the transmitter disclosed in my co-pending application, entitled "Self Powered Pulse Radio Transmitter," Ser. No. 242,413, filed Dec. 5, 1962 and which issued on Jan. 18, 1966 as United States Patent No. 3,230,455. This electrical energy is sufficient to be used as the sole source of power for driving various types of sensitive relays, such as frequency sensitive relays of the solid state type and the electromechanical type. The output of the transducer is also ideal as the gate signal source for silicon controlled rectifiers. A typical value for the transducer coil 15 is 2,000 ohms impedance. A typical value for the magnet 13 is a flux density of 10,000 gausses.

The transducer of the present invention is adapted to permit silicon controlled rectifiers to be used for new uses, heretofore not possible, when the transducer is used as the gate signal source for these rectifiers. Heretofore, most silicon controlled rectifiers have required complex circuitry in order to provide the gate signal needed to trigger the rectifier into conduction. By connecting the output of the transducer of the present invention to the gate and cathode terminals of a silicon controlled rectifier, the requirement of a complex triggering circuit is eliminated. An additional advantage is provided since the gate terminal of the silicon controlled rectifier is isolated from the balance of the circuit in which the rectifier is disposed. This means that it is not possible to have a transient voltage spike enter the gate electrode and inadvertently trigger the silicon controlled rectifier. A manually or mechanically operated silicon controlled rectifier is obtained by using the transduced of the present invention as the gate pulse source. Because the transducer of the present invention develops electrical energy by disturbing magnetic lines of flux, it is now possible to have a contactless, nonhermetic, explosion proof, manually operated silicon controlled rectifier switch. The manually or mechanically operated portion of the transducer may be mechanically and electrically isolated from the transducer coil in the silicon controlled rectifier.

Figure 4:
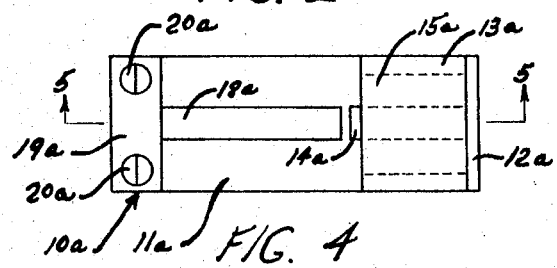
FIG. 4 is a top plan view of a second electromechanical transducer made in accordance with the principles of the of the present invention.
Figure 5:
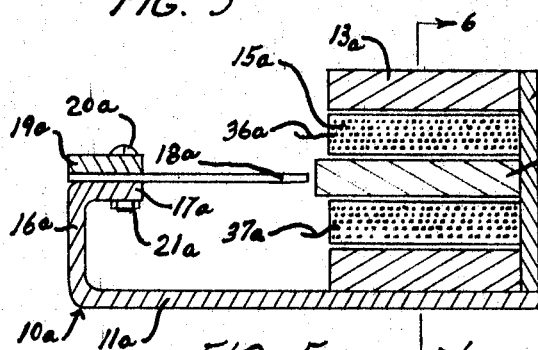
FIG. 5 is an elevational section view of the structure illustrated in FIG. 4, taken along the line 5—5 thereof, and looking in the direction of the arrows.
Figure 6:
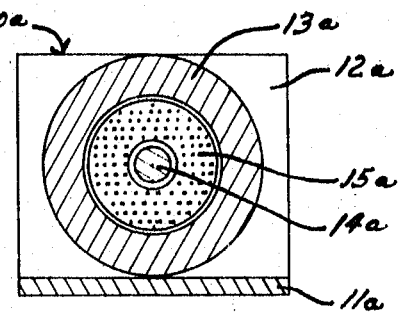
FIG. 6 is an elevational section view of the structure illustrated in FIG. 5, taken along the line 6—6 thereof, and looking in the direction of the arrows.

FIGS. 4, 5 and 6 demonstrate a second embodiment of the invention, wherein the electrical coil 15a has been disposed inside of the magnet 13a. The parts of the transducer embodiment of FIGS. 4, 5 and 6 which are the same as the parts of the first described embodiment of FIGS. 1, 2 and 3 have been marked with the reference numeral fololwed by the small letter a. Although it is not shown, it will be understood that the manually operated trip arm illustrated in the first embodiment would also be used in the embodiment of FIGS. 4, 5 and 6. The mechanical means heretofore referred to in Patent No. 3,056,932 may also be used for actuating the reed 18a.

As shown in FIGS. 4, 5 and 6, the magnet 13a is formed as a cylindrical magnet and surrounds the electrical coil 15a. The magnet 13a and pole piece 14a are fiexd to the shunt plate 12a. Another difference between the second embodiment and the first embodiment is that the reed 18a is made from a suitable magnetic material and the tip is made of the same material. The tip is spaced apart from the pole piece 14a by an air gap of the same dimension as set forth hereinbefore for the first embodiment. The second embodiment of FIGS. 4, 5 and 6 functions in the same manner as the first embodiment of FIGS. 1, 2 and 3.

Figure 7:
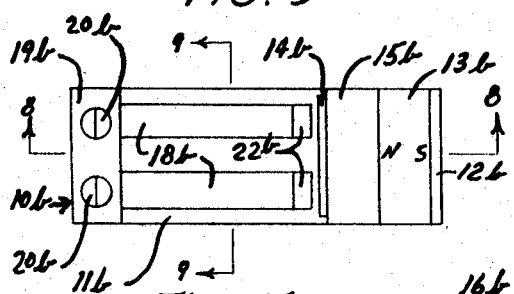
FIG. 7 is a top plan view of a third electromechanical transducer made in accordance with the principles of the present invention.
Figure 8:
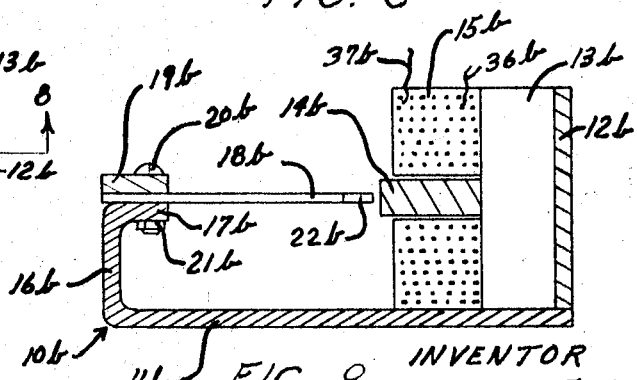
FIG. 8 is an elevational section view of the structure illustrated in FIG. 7, taken along the line 8—8 thereof, and looking in the direction of the arrows.

FIGS. 7, 8 and 9 illustrate a third embodiment of the invention wherein the transducer includes a pair of reeds 18b. The parts of the transducer embodiment of FIGS. 7, 8 and 9 which are the same as the parts of the first described embodiment of FIGS. 1, 2 and 3 have been marked with the same reference numerals followed by the small letter b. Although it is not shown, it will be understood that the manually operated trip arm illustrated in the first embodiment would also be used in the embodiment of FIGS. 7, 8 and 9. The mechanical means heretofore referred to in Patent No. 3,056,932 may also used for actuating the reeds 18b.

As shown in FIG. 7, the magnet 13b is elongated sidewise so as to face both of the reed tips 22b. The electrical coil 15b is elongated in the horizontal direction to surround the flattened and elongated horizontal pole piece 14b. The pair of reeds 18b are laterally spaced apart and are horizontally disposed in a plane parallel to the longitudinal axis of the pole piece 14b. The longitudinal axes of the reeds 18b are also parallel to the longitudinal axis of the pole piece 14b. The reed tips 22b are spaced apart from the pole piece 14b by air gaps of the same dimensions as set forth hereinbefore for the first embodiment. The third embodiment of FIGS. 7, 8 and 9 functions in the same manner as the first embodiment of FIGS. 1, 2 and 3, with the exception that, because of the pair of reeds 18b, more than one discrete sine wave can be produced. It will be seen, that by mounting more than one reed, each with a resonant frequency, at the end of the pole piece 14b, a plurality of discrete sine waves can be produced. These sine waves can be produced in either unison or separately.

FIGS. 10, 11 and 12 illustrate a fourth embodiment of the invention wherein the transducer 10c is provided with a dampening collar 30 for producing more than one discrete frequency. By moving the collar 30 along the length of the reed 18c, a variation in mechanical frequency of the reed 18c can thus be obtained. It will be seen that the third embodiment transducer 10b and the fourth embodiment transducer 10c may be used to provide multi-channel operation for transmitters of the type illustrated in my aforementioned co-pending application.

The parts of the transducer embodiment 10c of FIGS. 10, 11 and 12 which are the same as the parts of the first embodiment transducer 10 of FIGS. 1, 2 and 3 have been marked with the same reference numerals followed by the small letter c. Although it is not shown, it will be understood that the manually operated trip arm illustrated in the first embodiment of FIGS. 1, 2 and 3, would also be employed in the embodiment of FIGS. 10, 11 and 12. The mechanical means heretofore referred to in Patent No. 3,056,932 may also be used for actuating the reed 18c.

As shown in FIGS. 10 and 12, the transducer 10c is provided with a pair of frame side walls 28 and 29 which are formed integral with the frame base plate 11c. The collar 30 is provided with a pair of sidewardly outward extended guide arms 31 and 32 which are slidably mounted in the slots 33 and 34, respectively, formed in the side walls 28 and 29, respectively. As shown in FIGS. 11 and 12, the collar 30 is provided with the central slot 35 in which is slideably received the reed 18c. It will be seen that by sliding the dampening collar 30 backwardly and forwardly along the length of the reed 18c, the mechanical frequency of the reed 18c may be changed. The frame side walls 28 and 29 form a bracket for the sliding collar 30. The fourth embodiment of FIGS. 10, 11 and 12 functions in the same manner as the first embodiment of FIGS. 1, 2 and 3. It will be understood that either of the magnet arrangements of the first and second embodiments of FIGS. 1 and 4, respectively, can be used in the third and fourth embodiments of FIGS. 8 and 10, respectively. It will also be understood that the reeds 18b and 18c may or may not be tipped with permeable iron, as desired.

FIG. 13 illustrates a self powered radio control oscillator made in accordance with the principles of the present invention, and including as the sole source of electric power one of the electro-mechanical transducers of FIGS. 1, 4, 7 or 10. The numeral 10 indicates one of said transducers, and the numerals 36 and 37 indicate the electrical coil leads of the transducers. The electrical output of the transducer 10, as shown in FIG. 13, is conductively coupled to the oscillator circuit.

As shown in FIG. 13, one side of the transducer 10 is connected to one side of the coupling capacitor 48 with the other side of the coupling capacitor 48 being conductively connected to the base electrode 42 of a semiconductor 39. The semiconductor 39 may be of any suitable type and is provided with an emitter electrode 40, a base electrode 42 and a collector electrode 41. The first mentioned side of the transducer is further connected to one end of a radio frequency choke 38, with the other end of the radio frequency choke 38 being conductively coupled to the emitter electrode 40 of said semiconductor 39. The collector electrode 41 of the semiconductor 39 is conductively coupled to one end of a tank circuit 43 which includes a capacitor 45 and an inductor 44. The capacitor 45 and the inductor 44 are connected in parallel. The other end of the tank circuit 43 is connected to one side of a coupling capacitor 46, and the other side of the coupling capacitor 46 is connected to the base electrode 42 of the semiconductor 39. The said other end of the tank circuit 43 is also conductively coupled to the other side of the transducer 10. Said other side of the transducer 10 is also resistively coupled to the base electrode 42 of the semiconductor 39 by means of the base load resistor 47. The oscillator circuit operates in a tuned collector mode. When the reed 18 is tripped, an A.C. potential is developed in the coil 15. This A.C. potential is applied to the emitter-base junction of the transistor 39. The emitter-base junction of the transistor 39 rectifies the A.C. voltage and in this manner acts as a detector. The rectified voltage is then injected into resistor 47, causing a potential to develop across this resistor. This voltage, across resistor 47, then varies in concert with the rectified signal passed by the emitter-base junction. The voltage across resistor 47 then causes the collector current of the transistor to vary at the same rate, thus causing the radio frequency tank circuit 43 to oscillate at an R.F. rate, and to turn on and off in concert with the collector current. The emitter-base diode of the transistor simply blocks the half cycle of the sine wave that is not of the same polarity as the junction diode. The power output (R.F.) of the oscillator is proportional to the output of the transducer.

A list of typical values for the components of the illustrative embodiment of FIG. 13 is as follows:

| | | |
|---|---|---|
| Radio frequency choke | microhenries | 1.2 |
| Semiconductor | | 2N963 |
| Capacitor | mmf. (variable) | 1 to 5 |
| Inductor | microhenry | 1 |
| Capacitor | mf. | .002 |
| Resistor | ohms | 45K |
| Capacitor | mf. | .002 |

The aforementioned values are typical for a 200 mc. oscillator. However, it will be understood that other values may be used to produce other frequencies without in any way changing or departing from the principles of the present invention. It will also be understood that an NPN semiconductor can be used without changing the circuit of FIG. 13. It will be seen from FIG. 13 that the transducers of the present invention are capable of driving oscillators over a wide range of frequencies.

While it will be apparent that the preferred embodiments of the invention herein disclosed are well calculated to fulfill the objects above stated, it will be appreciated that the invention is susceptible to modification, variation and change.

What I claim is:
1. In a power supply, the combination, comprising:
 (a) a pole piece;
 (b) an electrical coil surrounding said pole piece;
 (c) a magnet disposed adjacent the pole piece in a position to induce flux lines in the pole piece;
 (d) at least one reed, capable of vibrating at a predetermined resonant frequency, and disposed in a position with the longitudinal axis thereof parallel to the longitudinal axis of the pole piece with a freely movable tip spaced adjacent one end of the pole piece;
 (e) means for disturbing the reed to vibrate the reed in front of said one end of the pole piece to disturb the magnetic lines of flux passing from the magnet to the pole piece to induce a voltage into the electrical coil;
 (f) a semiconductor having an emitter electrode, a base electrode and a collector electrode;
 (g) a first coupling capacitor having one side conductively coupled to one side of said coil and the other side connected to said base electrode;
 (h) a radio frequency choke having one end conductively connected to said one side of said coil and the other end conductively coupled to said emitter electrode;
 (i) a tank circuit including a capacitor and an inductor connected in parallel and having one end conductively connected to said collector electrode;
 (j) a second coupling capacitor having one side conductively connected to the other end of said tank circuit, with the other side of said second coupling capacitor being connected to said base electrode;
 (k) said other end of said tank circuit being conductively coupled to the other side of said electrical coil; and,
 (l) said other side of said electrical coil being resistively coupled to said base electrode by a base load resistor.
2. The structure defined in claim 1, wherein:
 (a) said power supply includes a plurality of reeds.
3. The structure defined in claim 1, wherein:
 (a) said reed is provided with a shielding material on the freely movable tip.
4. The structure defined in claim 1, including:
 (a) means slidably mounted on the reed for movement over the length of the reed to change the mechanical frequency of the reed.
5. The structure as defined in claim 1, wherein:
 (a) said magnet is disposed at the other end of said pole piece.
6. The structure as defined in claim 1, wherein:
 (a) said magnet surrounds the electrical coil; and,
 (b) said magnet and pole piece are interconnected by a magnet shunt of magnetic material.
7. The structure as defined in claim 1, wherein:
 (a) said reed is made from a nonmagnetic material and the tip is made from a magnetic material.
8. In a power supply, the combination, comprising:
 (a) a pole piece;
 (b) an electrical coil surrounding said pole piece;
 (c) a magnet disposed adjacent one end of the pole piece in a position to induce flux lines in the pole piece;
 (d) a plurality of reeds, each reed being capable of vibrating at a predetermined resonant frequency, and disposed in a position with the longitudinal axis thereof parallel to the longitudinal axis of the pole piece with a freely movable tip spaced adjacent the other end of the pole piece, each of said reeds being provided with a shielding material on the freely movable tip, said tip being made from a magnetic material;
 (e) means slidably mounted on each reed for movement over the length of the reed to change the mechanical frequency of the reed; and
 (f) means for disturbing each reed to vibrate the reed in front of said other end of the pole piece to disturb the magnetic lines of flux passing from the magnet of the pole pieces to induce a voltage into the electrical coil.

References Cited
UNITED STATES PATENTS

| | | | |
|---|---|---|---|
| 2,348,252 | 5/1944 | Mallina | 310—25 X |
| 2,429,094 | 10/1947 | Kent et al. | 310—25 X |
| 2,928,052 | 3/1960 | Wood | 310—25 X |
| 3,077,574 | 2/1963 | Marks | 325—185 X |
| 3,230,455 | 1/1966 | Kosta | 331—185 X |

FOREIGN PATENTS 569,276  1/1959  Canada.

ROY LAKE, Primary Examiner

SIEGFRIED H. GRIMM, Assistant Examiner

U.S. Cl. X.R.

310—25; 325—185; 331—116, 156, 185

UNITED STATES PATENT OFFICE

CERTIFICATE OF CORRECTION

Patent No. 3,457,522                      Dated July 22, 1969

James P. Kosta, Jr.

It is certified that error appears in the above-identified patent and that said Letters Patent are hereby corrected as shown below:

Column 5, line 8, "transduced" should be -- transducer --; line 32, "fiexd" should be -- fixed --; line 51, after "also" should be inserted -- be --. Column 6, line 2, after "in" should be inserted -- the --. Column 8, line 50, "of the pole pieces" should be -- to the pole piece --.

SIGNED AND
SEALED
MAR 24 1970

(SEAL)
Attest:

Edward M. Fletcher, Jr.
Attesting Officer

WILLIAM E. SCHUYLER, JR.
Commissioner of Patents